(12) United States Patent
Motey

(10) Patent No.: US 12,280,333 B2
(45) Date of Patent: *Apr. 22, 2025

(54) TECHNIQUES TO SYNTHESIZE GREENHOUSE GASES

(71) Applicant: Nataqua, Inc., Reno, NV (US)

(72) Inventor: Alexander Kian Motey, Los Altos, CA (US)

(73) Assignee: Nataqua, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/235,347

(22) Filed: Aug. 18, 2023

(65) Prior Publication Data

US 2023/0390701 A1     Dec. 7, 2023

Related U.S. Application Data

(63) Continuation-in-part of application No. 17/967,261, filed on Oct. 17, 2022, now Pat. No. 11,767,777,
(Continued)

(51) Int. Cl.
*B01D 53/96*     (2006.01)
*B01D 53/32*     (2006.01)
(Continued)

(52) U.S. Cl.
CPC .......... *B01D 53/965* (2013.01); *B01D 53/62* (2013.01); *C25B 3/07* (2021.01); *C25B 15/083* (2021.01); *F01N 3/0857* (2013.01); *B01D 53/326* (2013.01); *B01D 2257/504* (2013.01); *C25B 3/26* (2021.01); *F01N 3/01* (2013.01); *F01N 2240/34* (2013.01)

(58) Field of Classification Search
CPC  B01D 53/965; B01D 53/62; B01D 2257/504; B01D 2253/108; B01D 2253/3425; B01D 53/92; B01D 53/0407; B01D 53/326; C25B 3/07; C25B 15/083; C25B 3/03; C25B 3/26; F01N 3/0222; F01N 3/0807; F01N 3/0857; F01N 9/00; F01N 3/01; F01N 2240/04; F01N 2240/34
See application file for complete search history.

(56) References Cited

U.S. PATENT DOCUMENTS

2007/0282021 A1\* 12/2007 Campbell .................. C10J 3/00
                                                                 568/840
2009/0289227 A1\* 11/2009 Rising ....................... C25B 1/00
                                                                 422/600
(Continued)

OTHER PUBLICATIONS

Intl. Search Report for PCT Application PCT/US23/33493, mailed on Mar. 12, 2024.

*Primary Examiner* — Brandon D Lee
(74) *Attorney, Agent, or Firm* — Clause Eight; Michael Catania

(57) ABSTRACT

A process for capturing carbon dioxide ($CO_2$) emissions and converting the $CO_2$ into an alcohol fuel is disclosed herein. The process includes capturing $CO_2$ emissions from an exhaust mechanism of a machine at a $CO_2$ capture device. The process also includes converting the $CO_2$ emissions into an alcohol fuel using an electrolyzer.

15 Claims, 13 Drawing Sheets

Related U.S. Application Data which is a continuation-in-part of application No. 17/746,369, filed on May 17, 2022, now Pat. No. 11,519,311, which is a continuation-in-part of application No. 17/555,465, filed on Dec. 19, 2021, now Pat. No. 11,473,463.

(60) Provisional application No. 63/264,368, filed on Nov. 21, 2021, provisional application No. 63/237,461, filed on Aug. 26, 2021, provisional application No. 63/229,952, filed on Aug. 5, 2021, provisional application No. 63/187,876, filed on May 12, 2021, provisional application No. 63/135,850, filed on Jan. 11, 2021.

(51) Int. Cl.
*B01D 53/62* (2006.01)
*C25B 3/07* (2021.01)
*C25B 3/26* (2021.01)
*C25B 15/08* (2006.01)
*F01N 3/01* (2006.01)
*F01N 3/08* (2006.01)

(56) References Cited

U.S. PATENT DOCUMENTS

| | | | |
|---|---|---|---|
| 2018/0161719 A1* | 6/2018 | Peng | B01D 53/62 |
| 2020/0248324 A1* | 8/2020 | Legrand | C25B 3/25 |
| 2020/0317362 A1* | 10/2020 | Darling | C25B 9/23 |
| 2022/0297077 A1* | 9/2022 | Mizuguchi | C01B 32/50 |
| 2023/0265571 A1* | 8/2023 | Hugar | H01M 8/106 |
| | | | 204/282 |

* cited by examiner

TECHNIQUES TO SYNTHESIZE GREENHOUSE GASES

CROSS REFERENCES TO RELATED APPLICATIONS

The Present application is a continuation-in-part application of U.S. patent application Ser. No. 17/967,261, filed on Oct. 17, 2022, which is a continuation-in-part application of U.S. patent application Ser. No. 17/746,369, filed on May 17, 2022, now U.S. patent Ser. No. 11/519,311, issued on Dec. 6, 2022, which is a continuation-in-part application of U.S. patent application Ser. No. 17/555,465, filed on Dec. 19, 2021, now U.S. patent Ser. No. 11/473,463, issued on Oct. 18, 2022, which claims priority to U.S. Provisional Patent Application No. 63/135,850, filed on Jan. 11, 2021, now expired, U.S. Provisional Patent Application No. 63/187,876, filed on May 12, 2021, now expired, U.S. Provisional Patent Application No. 63/229,952, filed on Aug. 5, 2021, now expired, U.S. Provisional Patent Application No. 63/237,461, filed on Aug. 26, 2021, now expired, and U.S. Provisional Patent Application No. 63/264,368, filed on Nov. 21, 2021, now expired, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to the capture and conversion of greenhouse gas emissions.

Description of the Related Art

As the world closes in on decarbonizing our planet, some industries' path to net zero is undetermined. Some suggest that combustible fuels that produce no greenhouse gases (such as hydrogen) can fulfill that need. The drawback to this strategy is that there is an energy penalty for transporting the fuel to the location where it gets used as well as the extra logistical challenges of storing different types of fuels. By capturing CO2 emissions onboard machines, and converting said CO2 onsite at refueling stations to liquid fuel, and using that fuel for machines, the environmental economics suggest that this path is an attainable path to net zero emissions in difficult to electrify industries.

BRIEF SUMMARY OF THE INVENTION

The present invention provides a novel solution to removing exhaust from various sources, and converting the emissions (CO2) into a usable product.

One aspect of the present invention is a process for capturing carbon dioxide ($CO_2$) emissions from a $CO_2$ emitting machine and converting the $CO_2$ into an alcohol fuel. The process includes capturing $CO_2$ emissions from an exhaust mechanism of the machine at a $CO_2$ capture device on the machine. The process also includes transferring the $CO_2$ emissions to an electrolyzer. The process also includes mixing the $CO_2$ emissions with an electrolyte to create a $CO_2$ aqueous mixture. The process also includes transferring the $CO_2$ aqueous mixture to an electrochemical cell. The process also includes applying a voltage to the $CO_2$ aqueous mixture within the electrochemical cell to generate an alcohol and byproducts. The process also includes separating the alcohol and byproducts to separate the alcohol from the byproducts. The process also includes collecting the alcohol for use as a fuel for the machine.

Another aspect of the present invention is a process for capturing carbon dioxide ($CO_2$) emissions from the air and converting the $CO_2$ into an alcohol fuel. The process includes capturing $CO_2$ emissions from the air at direct $CO_2$ capture facility. The process also includes transferring the $CO_2$ emissions to an electrolyzer. The process also include mixing the $CO_2$ emissions with an electrolyte to create a $CO_2$ aqueous mixture. The process also includes transferring the $CO_2$ aqueous mixture to an electrochemical cell. The process also includes applying a voltage to the $CO_2$ aqueous mixture within the electrochemical cell to generate an alcohol and byproducts. The process also includes separating the alcohol and byproducts to separate the alcohol from the byproducts. The process also includes collecting the alcohol for use as a fuel for a machine.

The alcohol is preferably ethanol, methanol or 1-propanol.

The machine is preferably at least one of a maritime shipping vessel, an agriculture equipment, a mining equipment, or a truck.

The $CO_2$ capture device is preferably in flow communication with an exhaust mechanism for the machine.

Applying the voltage preferably occurs at an off-peak electricity time period.

The process optionally includes transferring the fuel to a storage tank for use by the machine. The storage tank is where existing refuelers add fuel.

The $CO_2$ conversion preferably occurs where the offloading of the $CO_2$ and refueling occurs.

The electrochemical cell is positioned within the electrolyzer.

Separating the alcohol and byproducts is preferably performed using a membrane filtration process, a pervaporation process or a distillation process.

Separating the alcohol and byproducts is alternatively performed using a membrane filtration process, and a heat source utilized to oxidize the hydrogen is also utilized to expedite the membrane filtration process.

The electrolyte is preferably a solution of water and at least one of sodium bicarbonate, potassium bicarbonate, lithium bicarbonate, rubidium bicarbonate, cesium bicarbonate or mixtures thereof.

Yet another aspect of the present invention is a process for capturing carbon dioxide ($CO_2$) emissions from a heavy duty truck and converting the $CO_2$ into other carbon based products. The process includes capturing $CO_2$ emissions from an exhaust mechanism of a heavy duty truck at a $CO_2$ capture device. The process also includes converting the $CO_2$ emissions into a carbon-based product using catalysis, such as an electrochemical process.

One method for converting the $CO_2$ emissions into a carbon-based product includes transferring the $CO_2$ to a $CO_2$ catalyst component of the $CO_2$ conversion device. The method also includes transferring water from a water tank of the $CO_2$ conversion device to the $CO_2$ catalyst component to mix with the $CO_2$. The method also includes generating a voltage at the $CO_2$ catalyst component to react the water with the $CO_2$. The method also includes converting the $CO_2$ to the carbon-based product. The method also includes filtering the carbon-based product and water through a membrane or other chemical separation device. The method also includes transferring the carbon-based product to a product tank and the water to the water tank.

Another method for converting the $CO_2$ emissions into the carbon-based product includes transferring the $CO_2$ to a $CO_2$ to ethanol catalyst component of the $CO_2$ conversion device. The method also includes transferring water from a water tank of the $CO_2$ conversion device to the $CO_2$ to ethanol catalyst component to mix with the $CO_2$. The method also includes generating a voltage at the $CO_2$ to ethanol catalyst component to react the water with the $CO_2$. The method also includes converting the $CO_2$ to ethanol, methanol and hydrogen. The method also includes filtering the ethanol, methanol, hydrogen and water through a membrane or other chemical separation device. The method also includes transferring the ethanol to an ethanol tank and the water to the water tank.

The process for includes transferring hydrogen and $CO_2$ to a $CO_2$ catalyst component, generating a voltage at the $CO_2$ catalyst component to react the hydrogen with the $CO_2$ to generate ethanol, and transferring the ethanol to the ethanol tank.

Yet another process for $CO_2$ absorption or adsorption to conversion for end-consumer consumable. The process includes attaching a hose between a tailpipe apparatus of a tailpipe of a vehicle and a $CO_2$ removal device or attaching the $CO_2$ tank to the inlet of the device designated for $CO_2$. The process also includes vacuuming the $CO_2$ from the tailpipe apparatus of the vehicle to a $CO_2$ catalyst component of the $CO_2$ removal device. The process also includes transferring water from a water tank of the $CO_2$ removal device to the $CO_2$ catalyst component to mix with the $CO_2$. The process also includes generating a voltage at the $CO_2$ catalyst component to react the water with the $CO_2$. The process also includes converting the $CO_2$ with water to an end-consumer consumable. The process also includes transferring the end-consumer consumable to a consumable tank of the $CO_2$ removal device.

Yet another aspect of the present invention is a process for capturing carbon dioxide ($CO_2$) emissions from an industrial facility and converting the $CO_2$ into other carbon based products. The process includes capturing $CO_2$ emissions from an exhaust mechanism of an industrial facility at a $CO_2$ capture device. The process also includes converting the $CO_2$ emissions into a carbon-based product using catalysis, such as an electrochemical process. The exhaust mechanism preferably includes boilers and furnaces for industrial buildings. The industrial buildings preferably include cement plants, steel mills, power plants, ethanol refineries and any other industrial plants that emit $CO_2$.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

One embodiment of the invention is capturing emissions from heavy duty trucks and converting the $CO_2$ into other products to refuel the heavy duty truck. Where the $CO_2$ conversion process is via catalysis, such as an electrochemical process. Where the $CO_2$ is converted into C1+ products defined as chemicals having 1 carbon atom. Where the $CO_2$ is converted into C2+ products defined as chemicals having 2 carbon atoms. Where the $CO_2$ is converted to an alcohol, an alkene, an aromatic, a hydrocarbon, or an alkane.

After it reacts with the $CO_2$->Ethanol Catalyst, the isolated $CO_2$ reacts with the solid catalyst and water, then ethanol bubbles inside of a solution composed of water.

Figure 1:
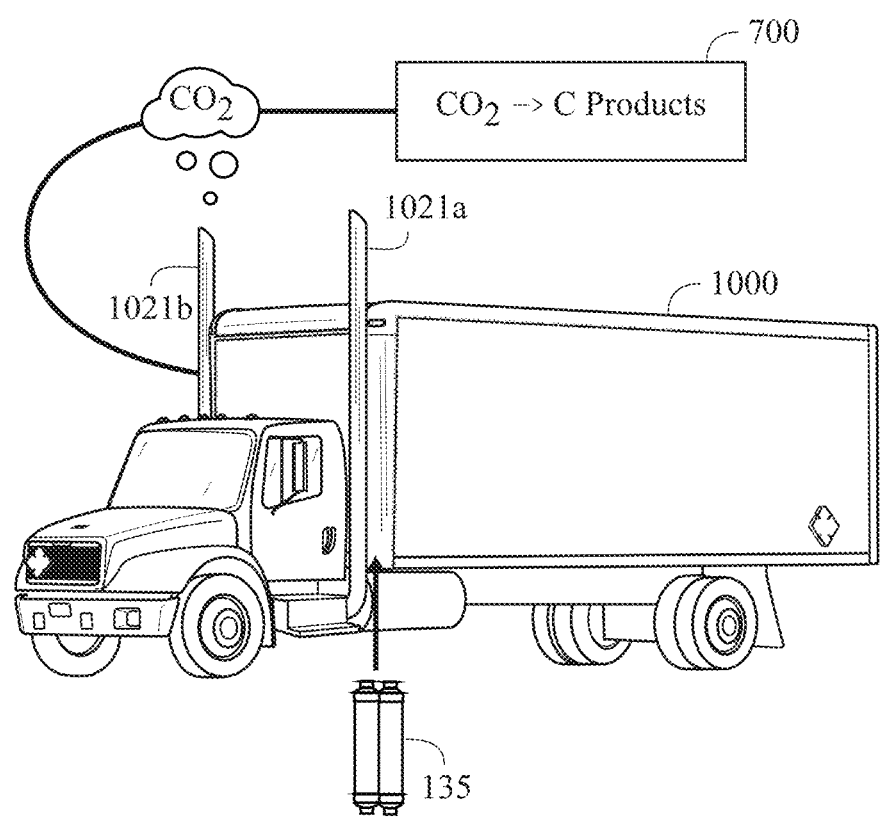
FIG. 1 is a block diagram of a $CO_2$ capture and conversion for a heavy duty truck.

FIG. 1 is a block diagram of a $CO_2$ capture and conversion for a heavy duty truck 1000. The heavy duty truck 1000 is preferably a diesel powered truck. The heavy duty truck 1000 preferably has an onboard $CO_2$ capture system 135 and stacked exhaust 1021*a-b*. The $CO_2$ conversion process is preferably via catalysis, such as an electrochemical process, at a $CO_2$ conversion component 700. The $CO_2$ is converted into C1+ products defined as chemicals having a single carbon atom. The $CO_2$ is converted into C2+ products defined as chemicals having two carbon atoms. The $CO_2$ is preferably converted to an alcohol, an alkene, an aromatic, a hydrocarbon, or an alkane.

Figure 2:
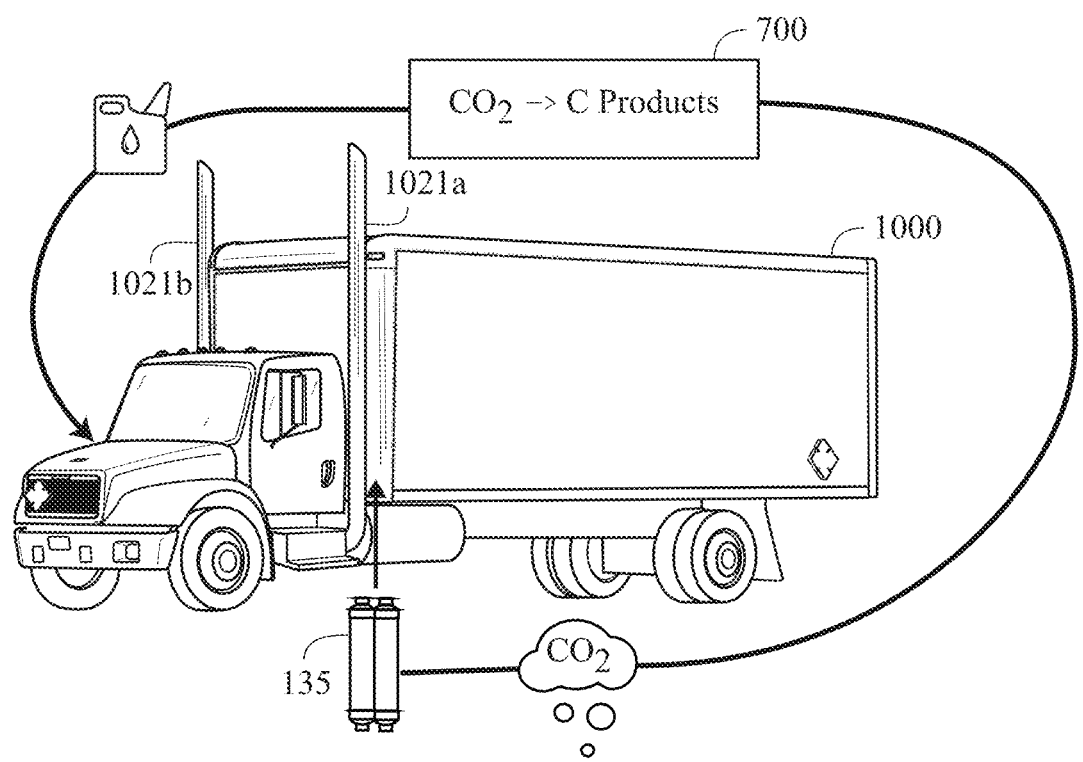
FIG. 2 is a block diagram of a mobile $CO_2$ capture and conversion for a heavy duty truck.

FIG. 2 is a block diagram of a $CO_2$ capture and conversion for a heavy duty truck 1000 to generate fuel for a flex fuel passenger vehicle 1100. The heavy duty truck 1000 may have an onboard $CO_2$ capture system 135. The $CO_2$ conversion process is via catalysis, such as an electrochemical process, at a $CO_2$ to ethanol conversion device 715. The $CO_2$ is converted into C1+ products defined as chemicals having a single carbon atom. The $CO_2$ is converted into C2+ products defined as chemicals having two carbon atoms. The $CO_2$ is converted to an alcohol, an alkene, an aromatic, a hydrocarbon, or an alkane. The converted $CO_2$ chemical is used to fuel the flex fuel passenger vehicle 1100.

Figure 3:
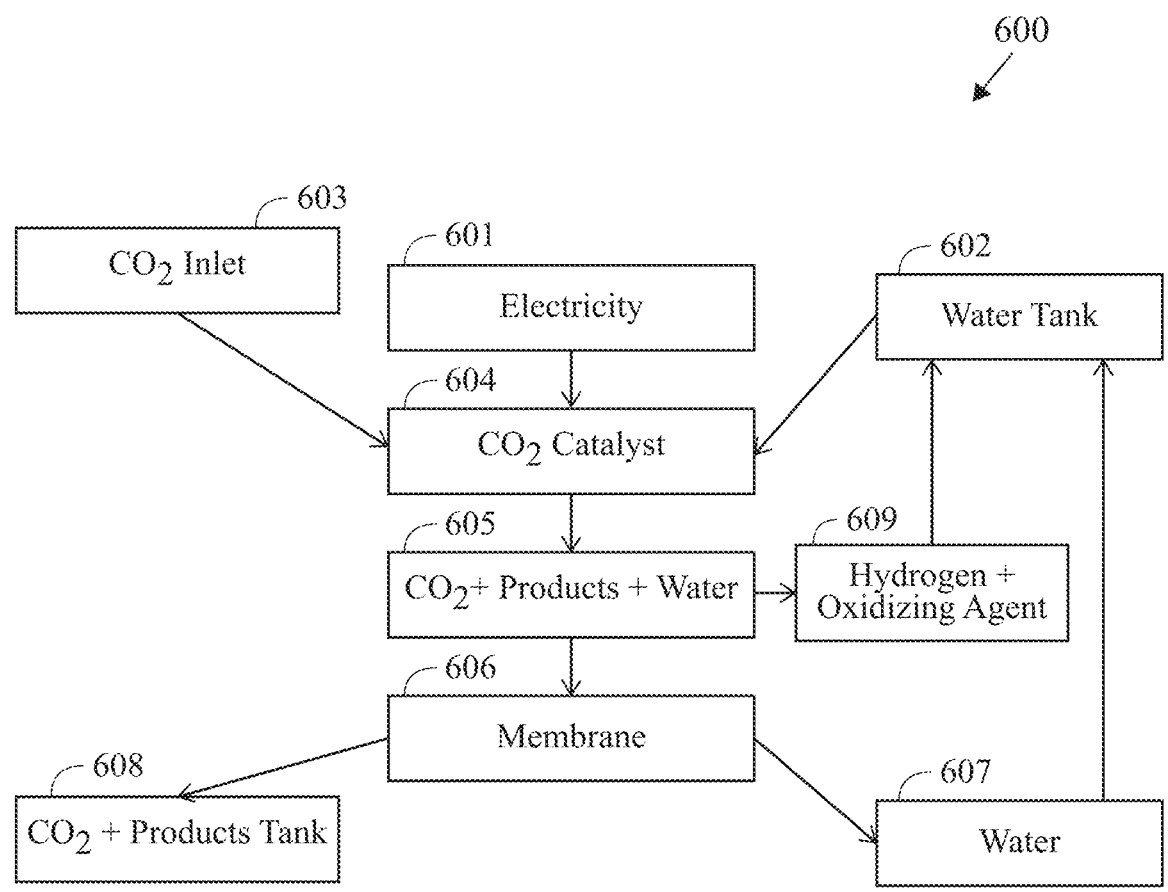
FIG. 3 is a flow chart of a method for $CO_2$ conversion.

FIG. 3 illustrates a flow chart for a method 600 for converting the $CO_2$ emissions into a carbon-based product. At block 603, $CO_2$ is transferred to a $CO_2$ catalyst component of the $CO_2$ conversion device at block 604. At block 602, water is transferred from a water tank of the $CO_2$ conversion device to the $CO_2$ catalyst component at block 604 to mix with the $CO_2$. At block 601, voltage is generated for the $CO_2$ catalyst component at block 604 to react the water with the $CO_2$. At block 605, the $CO_2$ is converted to the carbon-based product. At block 606, the carbon-based product and water is filtered through a membrane or other chemical separation device. At block 608, the carbon-based product is transferred to a product tank. At block 607, the water is transferred to the water tank. At block 609, a hydrogen byproduct from the water mixture is oxidized with an oxidizing agent to generate water and returned to the water tank at step 602.

The method preferably includes transferring hydrogen and $CO_2$ to a $CO_2$ catalyst component, generating a voltage at the $CO_2$ catalyst component to react the hydrogen with the $CO_2$ to generate ethanol, and transferring the ethanol to the ethanol tank.

The method also preferably includes oxidizing the hydrogen to $H_2O$ using a heating element.

The method also preferably includes transferring hydrogen and $CO_2$ to a $CO_2$ catalyst component, generating a voltage at the $CO_2$ catalyst component to react the hydrogen with the $CO_2$ to generate ethanol, and transferring the ethanol to the ethanol tank.

The method also preferably includes oxidizing the hydrogen to $H_2O$ using a heating element.

Figure 4:
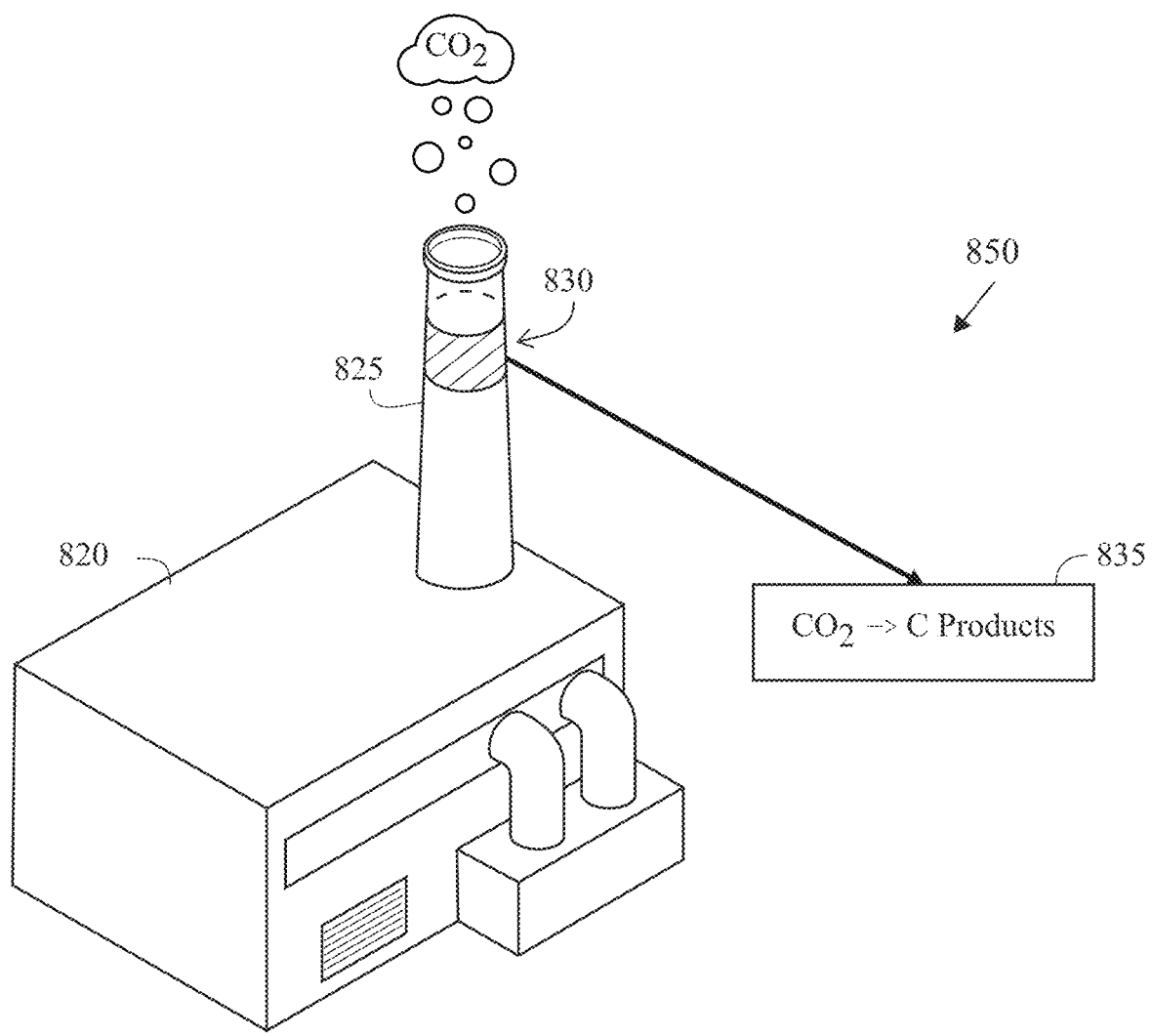
FIG. 4 is a block diagram of a $CO_2$ capture and conversion for an industrial building.

FIG. 4 illustrates a process 850 for capturing carbon dioxide ($CO_2$) emissions from an industrial facility 820 and converting the $CO_2$ into other carbon based products. The process includes capturing $CO_2$ emissions from an exhaust mechanism 825 of the industrial facility 820 at a $CO_2$ capture device 830. The process also includes converting the $CO_2$ emissions into a carbon-based product at a carbon conversion site 835 using catalysis, such as an electrochemical process. The exhaust mechanism 825 preferably includes boilers and furnaces for industrial buildings. The industrial buildings preferably include cement plants, steel mills and power plants. The industrial building may also be a commercial building or residential apartment building. The process may also be sized to use with a residential home.

Figure 5A:
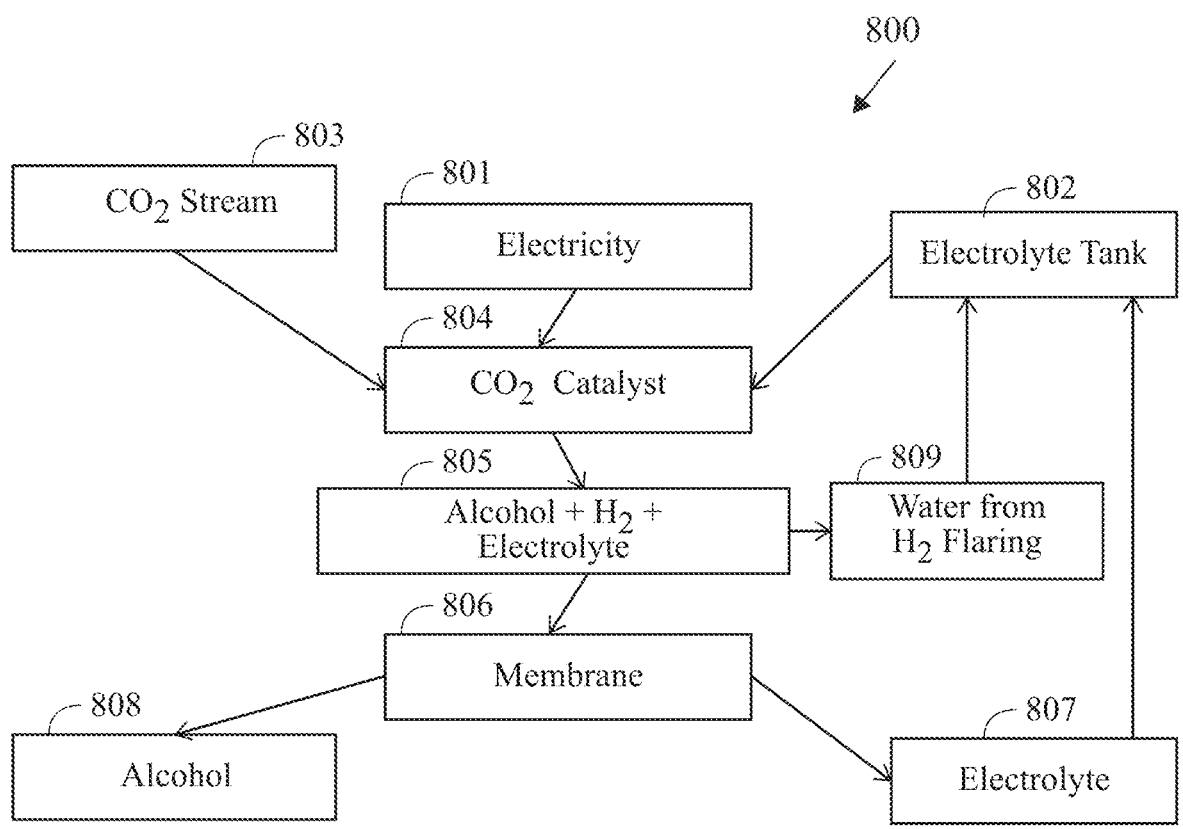
FIG. 5A is a flow chart of a method for $CO_2$ conversion to ethanol.

FIG. 5A illustrates a flow chart for a process 800 for capturing carbon dioxide ($CO_2$) emissions from a $CO_2$ emitting machine and converting the $CO_2$ into an alcohol fuel. At block 803, $CO_2$ is transferred to an electrolyzer at block 804. At block 802, electrolytes are transferred from an electrolyte tank to the electrolyzer at block 804 to mix with the $CO_2$. At block 801, voltage is applied to the $CO_2$ aqueous mixture within the electrochemical cell at block 804 to react the electrolytes with the $CO_2$. At block 805, the $CO_2$ is converted to the alcohol and byproducts. At block 806, the alcohol is separated from the byproducts use a separation technique such as a membrane filtration process, a pervaporation process or a distillation process. At block 808, the alcohol is collected for use as a fuel for the machine. At block 807, the electrolyte byproducts are transferred to the electrolyte tank. At block 809, a hydrogen byproduct converted in oxygen or air to create water and a byproduct mixture, in which the water is recirculated into the electrochemical cell.

Figure 5B:
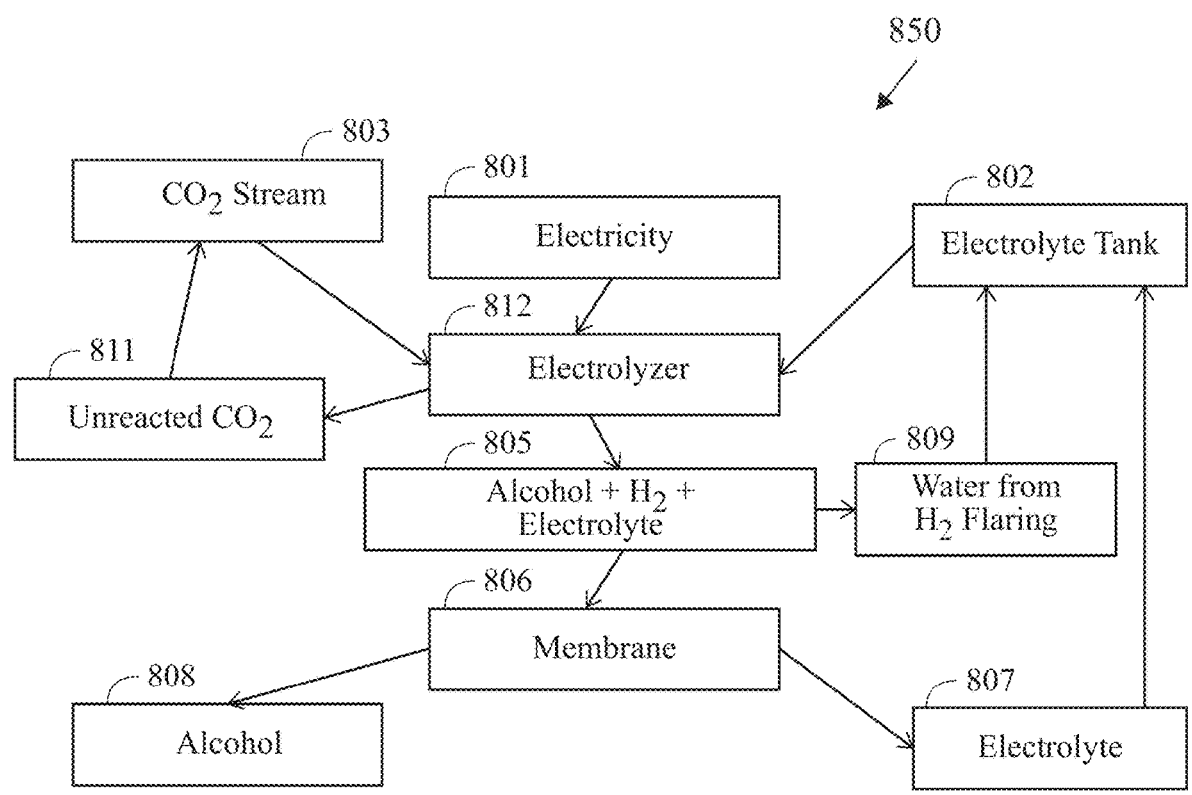
FIG. 5B is a flow chart of a method for $CO_2$ conversion to ethanol.

FIG. 5B illustrates a flow chart for an alternative process 850 for capturing carbon dioxide ($CO_2$) emissions from a $CO_2$ emitting machine and converting the $CO_2$ into an alcohol fuel. At block 803, $CO_2$ is transferred to an electrolyzer at block 812. At block 811, unreacted $CO_2$ is reintroduced into the $CO_2$ stream at block 803. At block 802, electrolytes are transferred from an electrolyte tank to the electrolyzer at block 812 to mix with the $CO_2$. At block 801, electricity is applied to the $CO_2$ aqueous mixture within the electrochemical cell at block 812 to react the electrolytes with the $CO_2$. At block 805, the $CO_2$ aqueous mixture is converted to the alcohol, hydrogen and electrolyte. At block 806, the alcohol is separated from the byproducts using a membrane filtration process. At block 808, the alcohol is collected for use as a fuel for the machine. At block 807, the electrolyte byproducts are transferred to the electrolyte tank. At block 809, a hydrogen byproduct converted in oxygen or air to create water and a byproduct mixture, in which the water is recirculated into the electrolyte tank at block 802.

Figure 10A:
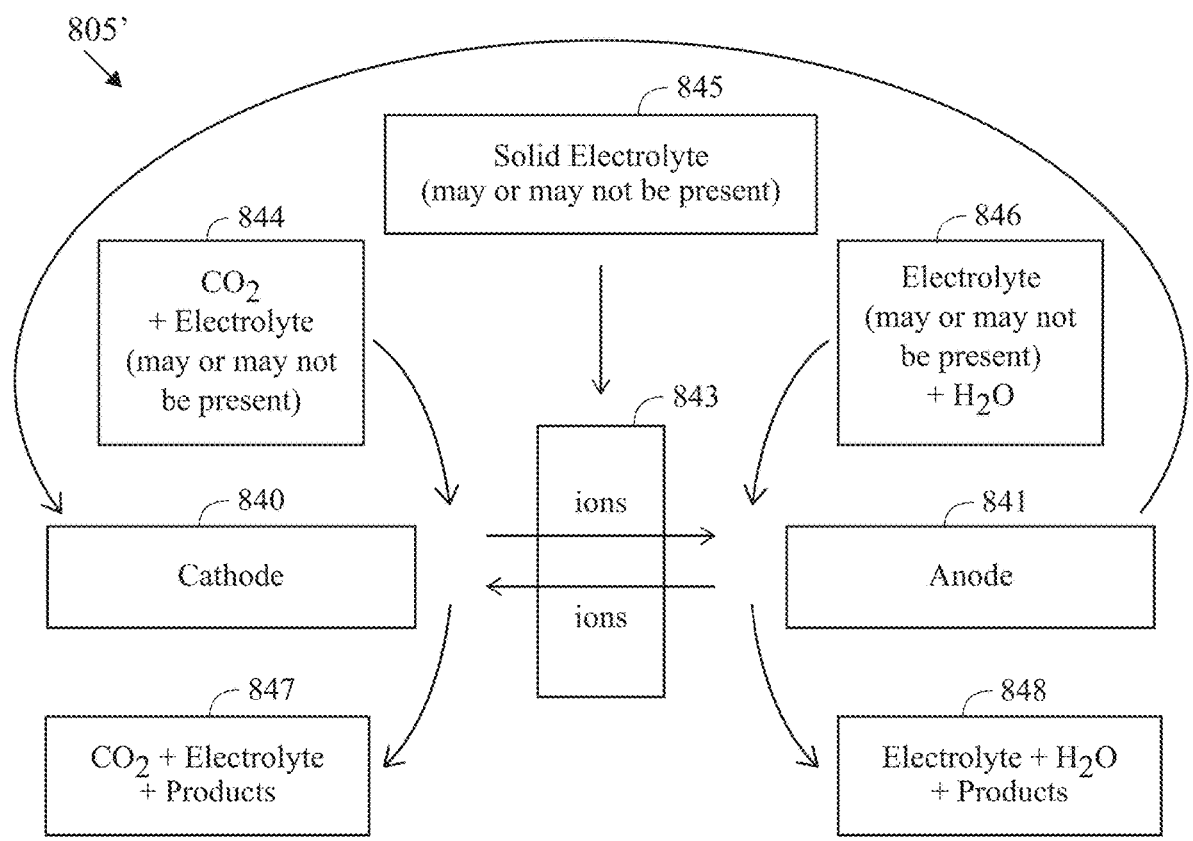
FIG. 10A is an alternative embodiment for the conversion step of the process of FIG. 5A.
Figure 10B:
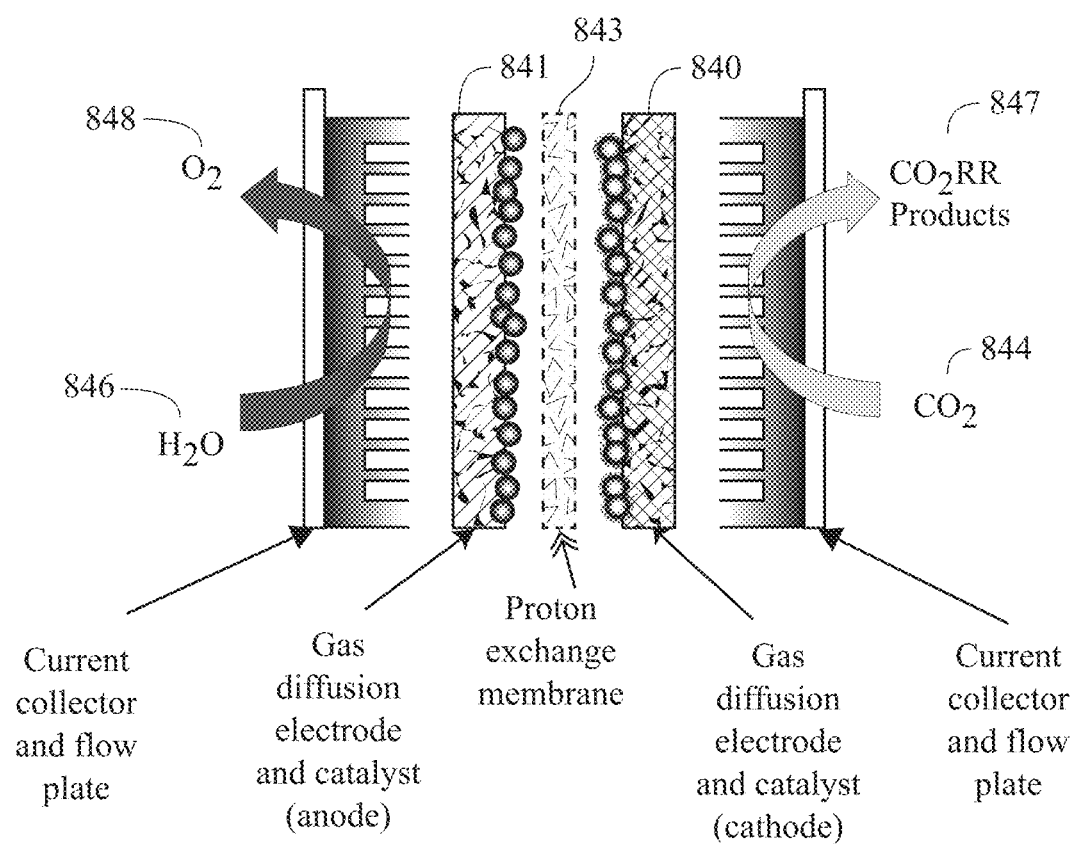
FIG. 10B is an alternative embodiment for the conversion step of the process of FIG. 5A.
Figure 10C:
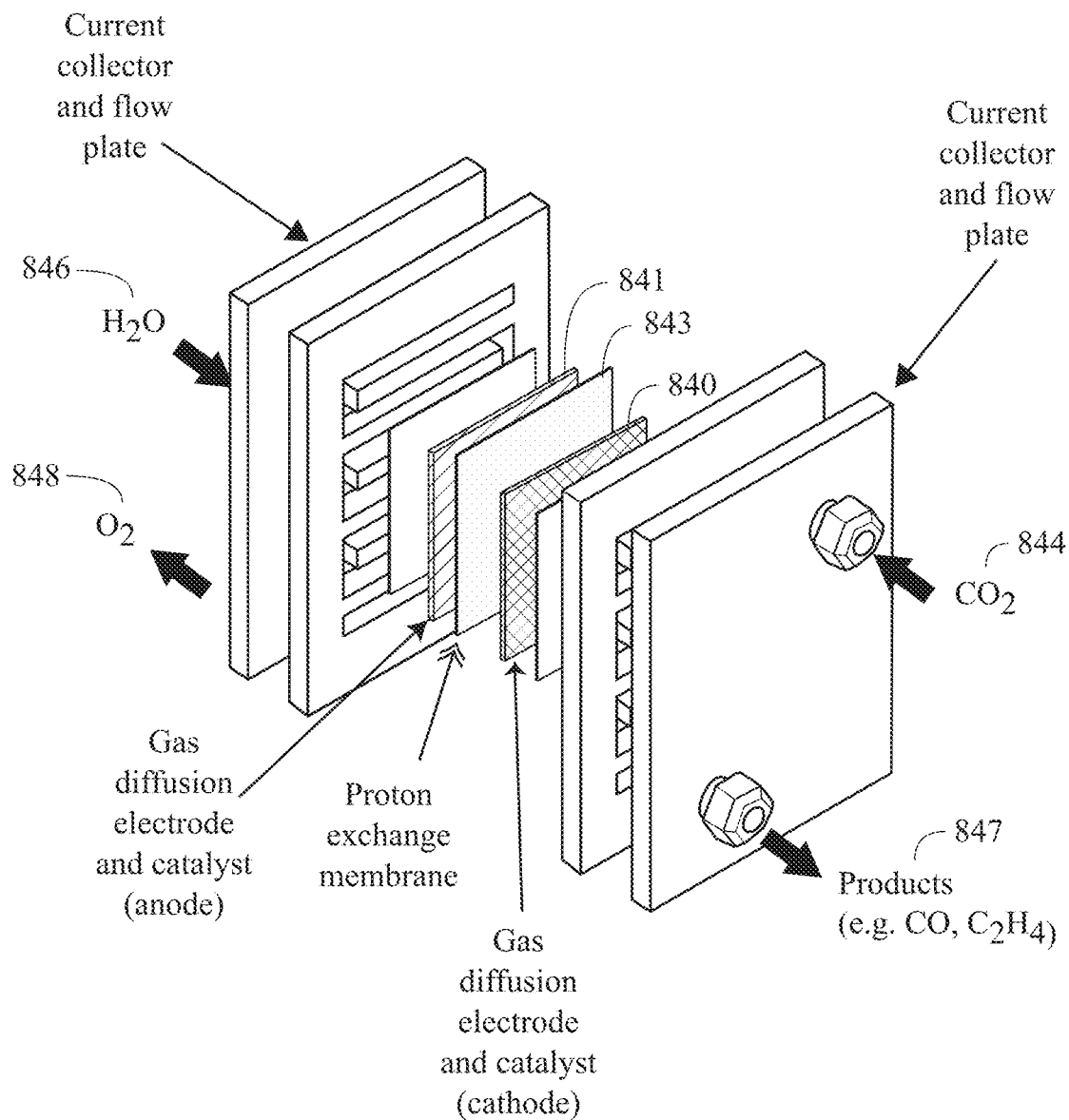
FIG. 10C is an alternative embodiment for the conversion step of the process of FIG. 5A.

FIGS. 10A, 10B and 10C illustrate an alternative embodiment of conversion step of the process 800 of FIG. 5A. As shown in FIGS. 10A, 10B and 10C, the conversion step 805' includes the use a member electrode assembly (MEA) 843, that preferably has an alkali anion exchange membrane or a proton-exchange membrane sandwiched between two electrodes, the cathode 840 and the anode 841. At block 844, $CO_2$, and optionally an electrolyte, is introduced into the MEA 843. At block 845, a solid electrolyte is optionally included in the MEA 843. At block 846, $H_2O$, and optionally an electrolyte, is introduced into the MEA 843. At block 847, $CO_2$, electrolyte and products are transferred from the MEA 843. The products include alcohol such as ethanol or methanol. At block 848, $H_2O$, electrolyte and products are transferred from the MEA 843.

Figure 6:
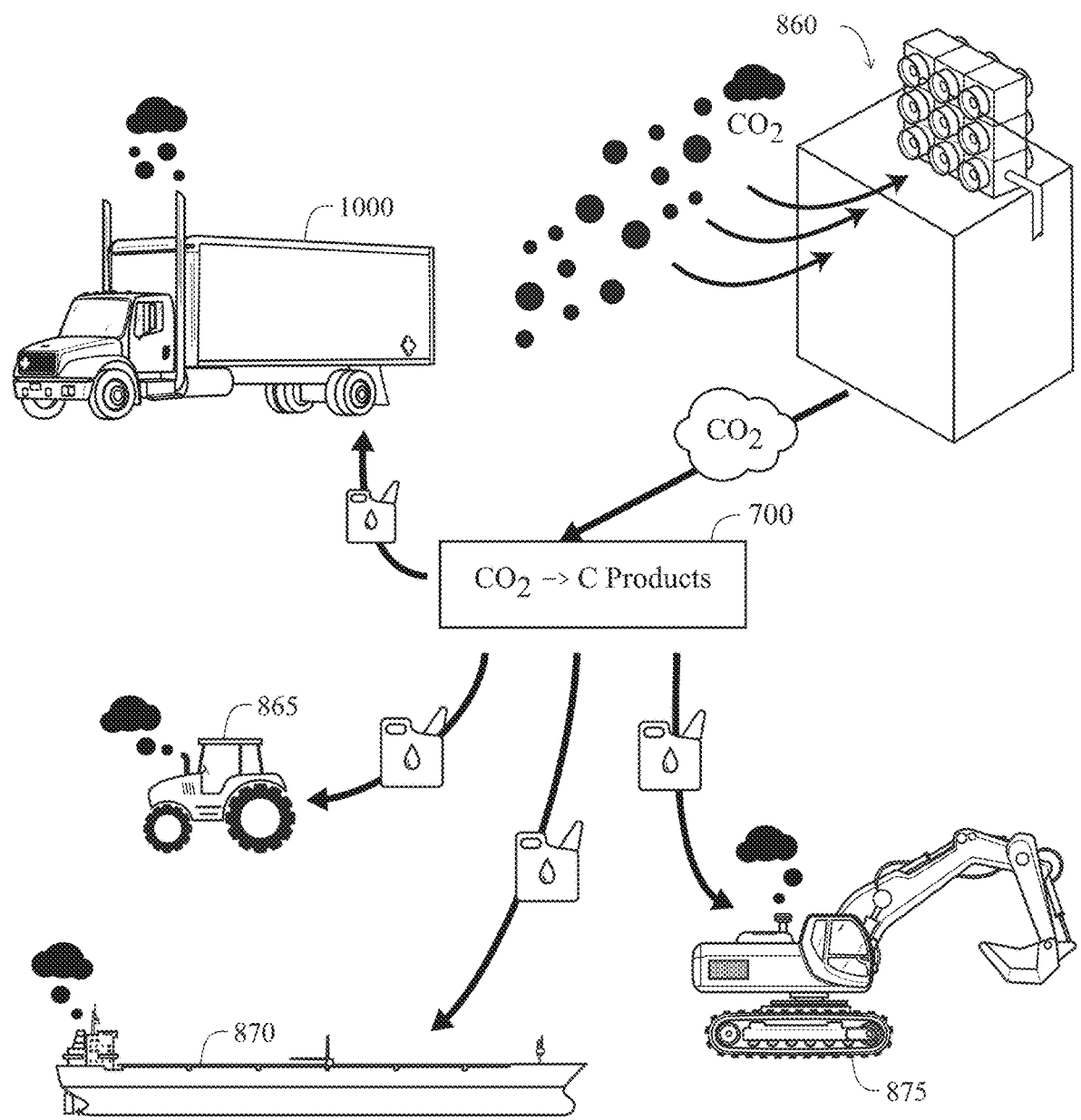
FIG. 6 is a block diagram of a $CO_2$ capture and conversion process.

FIG. 6 is a block diagram of a process for capturing carbon dioxide ($CO_2$) emissions from the air and converting the $CO_2$ into an alcohol fuel using a direct air capture facility 860. The process includes capturing $CO_2$ emissions from the air at direct $CO_2$ capture facility. The process also includes transferring the $CO_2$ emissions to an electrolyzer. The process also include mixing the $CO_2$ emissions with an electrolyte to create a $CO_2$ aqueous mixture. The process also includes transferring the $CO_2$ aqueous mixture to an electrochemical cell. The process also includes applying a voltage to the $CO_2$ aqueous mixture within the electrochemical cell to generate an alcohol and byproducts. Preferably, the $CO_2$ is converted into greater than 80% ethanol and less than 20% hydrogen. The process also includes separating the alcohol and byproducts to separate the alcohol from the byproducts. The process also includes collecting the alcohol for use as a fuel for a machine.

The $CO_2$ conversion process is preferably via catalysis, such as an electrochemical process or a photocatalytic process, at a $CO_2$ conversion component 700. The $CO_2$ is converted into C1+ products defined as chemicals having a single carbon atom. The $CO_2$ is converted into C2+ products defined as chemicals having two carbon atoms. The $CO_2$ is preferably converted to an alcohol, an alkene, an aromatic, a hydrocarbon, or an alkane. The converted $CO_2$ is used to refuel a multitude of equipment and vehicles, including but not limited to, heavy duty trucks 1000, tractors 865, maritime vessels, such as cargo ships 870, and mining equipment, such as excavators 875.

Figure 7:
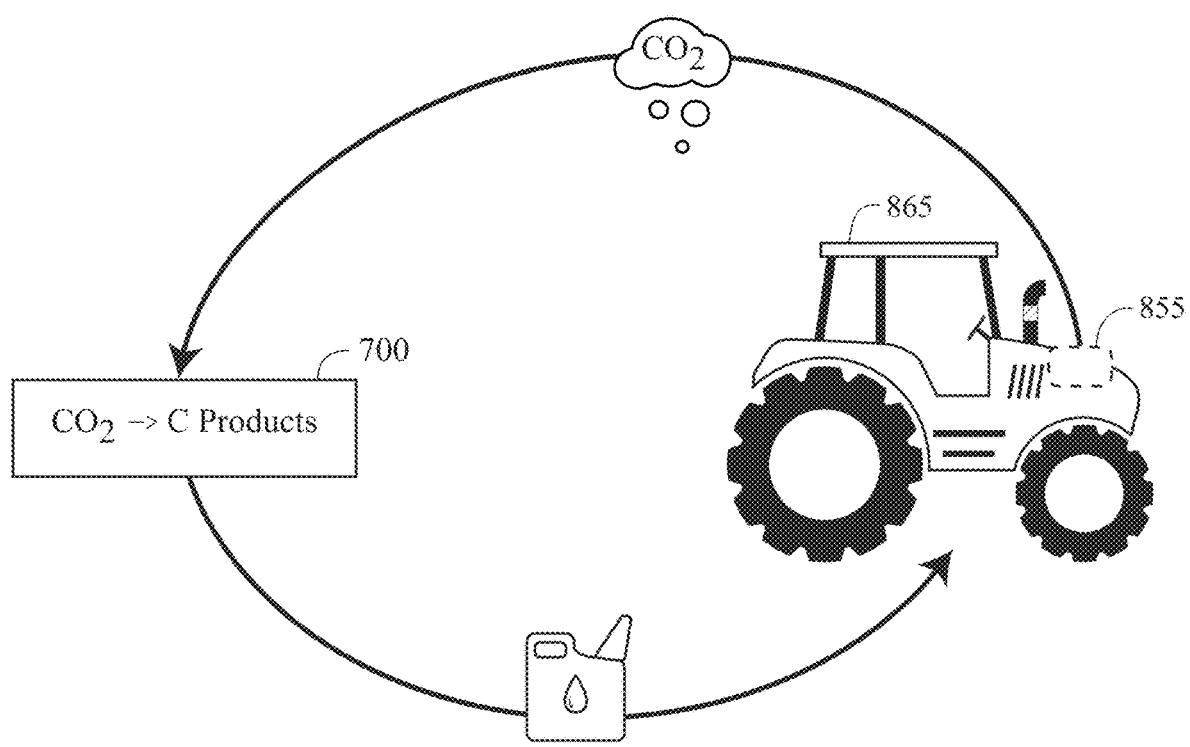
FIG. 7 is a block diagram of a $CO_2$ capture and conversion for a tractor.

FIG. 7 is a block diagram of a mobile $CO_2$ capture and conversion for a tractor 865. The tractor 865 preferably has an onboard $CO_2$ capture system 855. The $CO_2$ conversion process is preferably via catalysis, such as an electrochemical process or a photocatalytic process, at a $CO_2$ conversion component 700. The $CO_2$ is converted into C1+ products defined as chemicals having a single carbon atom. The $CO_2$ is converted into C2+ products defined as chemicals having two carbon atoms. The $CO_2$ is preferably converted to an alcohol, an alkene, an aromatic, a hydrocarbon, or an alkane. The converted $CO_2$ is used to refuel the tractor 865.

Figure 8:
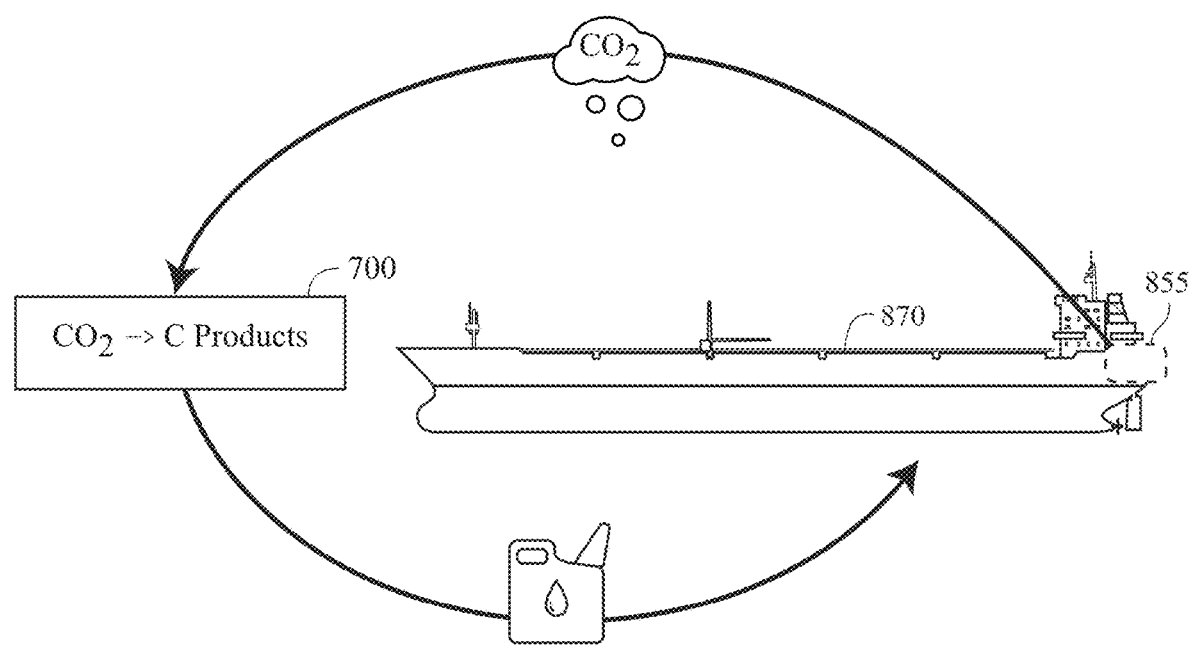
FIG. 8 is a block diagram of a $CO_2$ capture and conversion for a cargo ship.

FIG. 8 is a block diagram of a mobile $CO_2$ capture and conversion for a ship 870. The ship can be any type of container ships, general cargo ships, tankers, dry bulk carriers (chinamax, handymax, capesize, Suezmax, Q-max, etc.) multi-purpose vessels, reefer ships, roll-on/roll-off vessels, etc. The ship 870 preferably has an onboard $CO_2$ capture system 855. The $CO_2$ conversion process is preferably via catalysis, such as an electrochemical process or a photocatalytic process, at a $CO_2$ conversion component 700. The $CO_2$ is converted into C1+ products defined as chemicals having a single carbon atom. The $CO_2$ is converted into C2+ products defined as chemicals having two carbon atoms. The $CO_2$ is preferably converted to an alcohol, an alkene, an aromatic, a hydrocarbon, or an alkane. The converted $CO_2$ is used to refuel the cargo ship 870.

Figure 9:
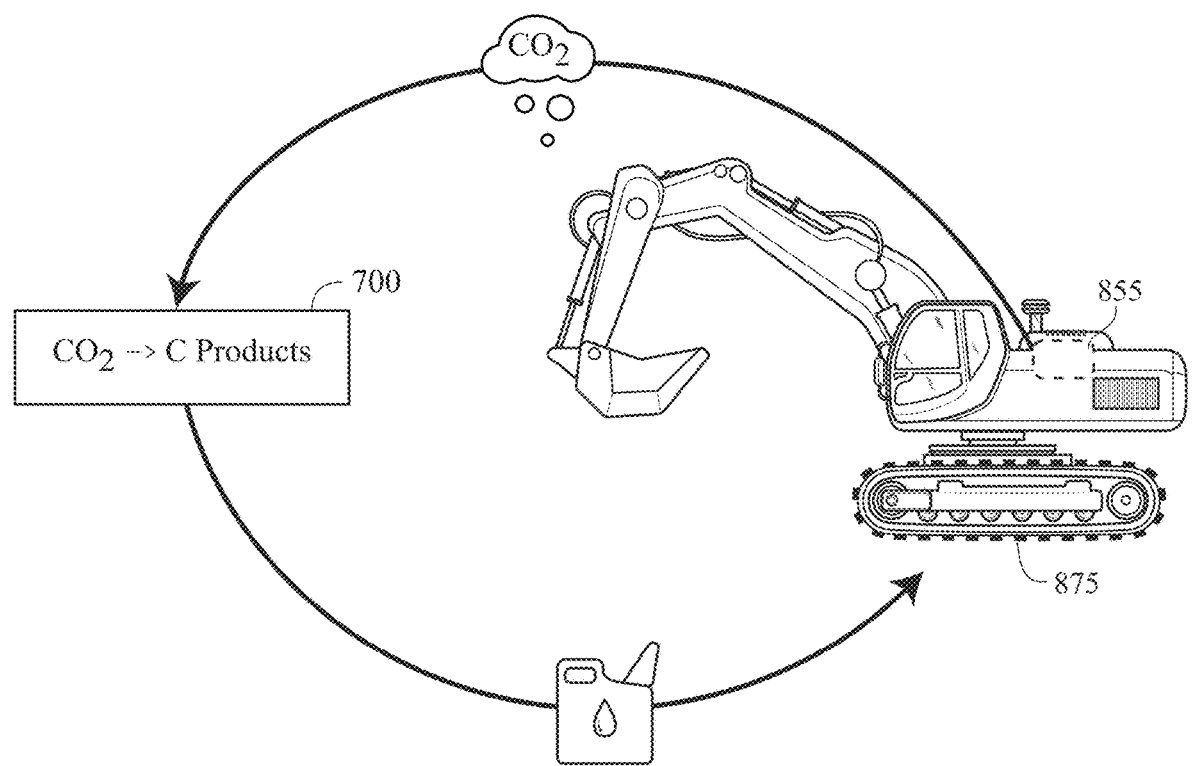
FIG. 9 is a block diagram of a $CO_2$ capture and conversion for an excavator.

FIG. 9 is a block diagram of a mobile $CO_2$ capture and conversion for an excavator 875. The excavator 875 preferably has an onboard $CO_2$ capture system 855. The $CO_2$ conversion process is preferably via catalysis, such as an electrochemical process or a photocatalytic process, at a $CO_2$ conversion component 700. The $CO_2$ is converted into C1+ products defined as chemicals having a single carbon atom. The $CO_2$ is converted into C2+ products defined as chemicals having two carbon atoms. The $CO_2$ is preferably converted to an alcohol, an alkene, an aromatic, a hydrocarbon, or an alkane. The converted $CO_2$ is used to refuel the excavator 875.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention the following:

1. A process for capturing carbon dioxide ($CO_2$) emissions from a $CO_2$ emitting heavy duty truck and converting the $CO_2$ into an alcohol fuel, the process comprising:
   capturing $CO_2$ emissions from an exhaust mechanism of the heavy duty truck at a $CO_2$ capture device on the heavy duty truck;
   transferring the $CO_2$ emissions to an electrolyzer;
   mixing the $CO_2$ emissions with an electrolyte to create a $CO_2$ aqueous mixture;
   transferring the $CO_2$ aqueous mixture to an electrochemical cell, wherein the electrochemical cell comprises a proton exchange membrane, a gas diffusion anode and catalyst attached a first end to a first end of the proton exchange membrane, a first current collector and flow plate attached to a second end of the gas diffusion anode and catalyst, a gas diffusion cathode and catalyst attached on a first end to a second end of the proton exchange membrane, and a second current collector and flow plate attached to a second end of the gas diffusion cathode and catalyst;
   applying a voltage to the $CO_2$ aqueous mixture within the electrochemical cell to generate an alcohol and byproducts;
   separating the alcohol and byproducts to separate the alcohol from the byproducts; and
   collecting the alcohol for use as a fuel for the heavy duty truck.

2. The process according to claim 1 wherein the byproduct is hydrogen and further comprising converting the hydrogen in oxygen or air to create water and a byproduct mixture and recirculating the water into the electrochemical cell.

3. The process according to claim 1 wherein the alcohol is ethanol, methanol or 1-propanol.

4. The process according to claim 1 further comprising transferring the fuel to a storage tank for use by the heavy duty truck.

5. The process according to claim 4 wherein the storage tank is where existing refuelers add fuel.

6. The process according to claim 1 wherein the $CO_2$ capture device is in flow communication with an exhaust mechanism for the heavy duty truck.

7. The process according to claim 1 wherein applying the voltage occurs at an off-peak electricity time period.

8. The process according to claim 1 wherein the $CO_2$ conversion occurs where the offloading of the $CO_2$ and refueling occurs.

9. The process according to claim 1 wherein the electrochemical cell is positioned within the electrolyzer.

10. The process according to claim 1 wherein the separating the alcohol and byproducts is performed using a membrane filtration process, a pervaporation process or a distillation process.

11. The process according to claim 2 wherein separating the alcohol and byproducts is performed using a membrane filtration process, and wherein a heat source utilized to oxidize the hydrogen is also utilized to expedite the membrane filtration process.

12. The process according to claim 1 wherein the electrolyte is a solution of water and at least one of sodium bicarbonate, potassium bicarbonate, lithium bicarbonate, rubidium bicarbonate, cesium bicarbonate or mixtures thereof.

13. The process according to claim 1 wherein separating the alcohol and byproducts is performed using a membrane electrode assembly comprising an alkali anion exchange membrane, a cathode and an anode.

14. A process for capturing carbon dioxide ($CO_2$) emissions from a $CO_2$ emitting passenger vehicle and converting the $CO_2$ into an alcohol fuel, the process comprising:
   capturing $CO_2$ emissions from an exhaust mechanism of the passenger vehicle at a $CO_2$ capture device on the passenger vehicle;
   transferring the $CO_2$ emissions to an electrolyzer;
   mixing the $CO_2$ emissions with an electrolyte to create a $CO_2$ aqueous mixture;
   transferring the $CO_2$ aqueous mixture to an electrochemical cell, wherein the electrochemical cell comprises a proton exchange membrane, a gas diffusion anode and catalyst attached a first end to a first end of the proton exchange membrane, a first current collector and flow plate attached to a second end of the gas diffusion anode and catalyst, a gas diffusion cathode and catalyst attached on a first end to a second end of the proton exchange membrane, and a second current collector and flow plate attached to a second end of the gas diffusion cathode and catalyst;
   applying a voltage to the $CO_2$ aqueous mixture within the electrochemical cell to generate an alcohol and byproducts;
   separating the alcohol and byproducts to separate the alcohol from the byproducts; and
   collecting the alcohol for use as a fuel for the passenger vehicle.

15. A process for capturing carbon dioxide ($CO_2$) emissions from a $CO_2$ emitting excavator and converting the $CO_2$ into an alcohol fuel, the process comprising:
   capturing $CO_2$ emissions from an exhaust mechanism of the excavator at a $CO_2$ capture device on the excavator;

transferring the CO$_2$ emissions to an electrolyzer;
mixing the CO$_2$ emissions with an electrolyte to create a CO$_2$ aqueous mixture;
transferring the CO$_2$ aqueous mixture to an electrochemical cell, wherein the electrochemical cell comprises a proton exchange membrane, a gas diffusion anode and catalyst attached a first end to a first end of the proton exchange membrane, a first current collector and flow plate attached to a second end of the gas diffusion anode and catalyst, a gas diffusion cathode and catalyst attached on a first end to a second end of the proton exchange membrane, and a second current collector and flow plate attached to a second end of the gas diffusion cathode and catalyst;
applying a voltage to the CO$_2$ aqueous mixture within the electrochemical cell to generate an alcohol and byproducts;
separating the alcohol and byproducts to separate the alcohol from the byproducts; and
collecting the alcohol for use as a fuel for the excavator.

* * * * *